(12) United States Patent
Lutgen et al.

(10) Patent No.: US 6,317,224 B1
(45) Date of Patent: Nov. 13, 2001

(54) METHOD AND APPARATUS FOR MODIFYING FACSIMILE DATA TRANSFER RATES BASED UPON VARYING BIT RATES OF A TRANSPORT MEDIUM

(75) Inventors: Craig Lawrence Lutgen, Fort Worth; Stephen Matthew West, Arlington, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/398,633

(22) Filed: Sep. 17, 1999

(51) Int. Cl.[7] ....................................................... H04N 1/32
(52) U.S. Cl. ........................... 358/412; 358/468; 375/220; 370/464
(58) Field of Search .................................... 358/400, 435, 358/434, 468, 412; 375/222, 219, 220; 370/468, 473, 464

(56) References Cited

U.S. PATENT DOCUMENTS

| | | | |
|---|---|---|---|
| 5,491,565 | * | 2/1996 | Naper ..................................... 358/468 |
| 5,682,386 | * | 10/1997 | Arimilli et al. ....................... 370/468 |
| 5,742,639 | * | 4/1998 | Fasulo, II et al. .................... 375/219 |

* cited by examiner

Primary Examiner—Jerome Grant, II
(74) Attorney, Agent, or Firm—Mario J. Donato, Jr.; Jeffrey K. Jacobs

(57) ABSTRACT

An apparatus and method for modifying facsimile data transfer rates based upon varying bit rates of a transport medium. The apparatus includes a channel quality monitor adapted to monitor channel quality of an asynchronous link, and a rate modifier adapted to dynamically modify a maximum data transfer rate between the originating facsimile machine and the terminating facsimile machine in response to the channel quality.

14 Claims, 6 Drawing Sheets

METHOD AND APPARATUS FOR MODIFYING FACSIMILE DATA TRANSFER RATES BASED UPON VARYING BIT RATES OF A TRANSPORT MEDIUM

FIELD OF THE INVENTION

The present invention relates generally to facsimile telecommunication systems, and more particularly, to a method and apparatus for modifying facsimile data transfer rates based upon varying bit rates of a transport medium.

BACKGROUND OF THE INVENTION

Before a facsimile image is transmitted from an originating facsimile machine to a terminating facsimile machine, the originating and terminating facsimile machines send messages between the machines to negotiate transmitting and receiving modes for transferring facsimile data. Such transmitting and receiving modes specify a set of parameters that are agreed upon prior to transferring facsimile data. These parameters may include a data bit rate, a page size, the number of pixels per line, the number of lines per page, and whether or not any field characters are added to a line so that the terminating facsimile machine has time to print each line. However, for wireless systems implementing analog facsimile sessions as described in IS-707-A.7, a problem arises concerning the quality of the transport channel across the RF interface. The prior art, and the IS-707-A.7 standard itself, addresses the areas of rate fallback and rate mismatch using system configuration parameters found in a Maximum Rate Message (MRT). The MRM broadcasts a top limit of data rates for analog facsimile sessions to all terminals in the system. However, such a system is required to be designed to a fixed maximum throughput limit that would be expected for all terminals in a particular coverage area.

Other prior art is found in the T.30 procedures for Document Facsimile Transmission in the General Switched Telephone Network Specification, which is propagated by the International Telecommunication Unit (ITU). In the T.30 procedures, a channel quality monitoring procedure is implemented through a Training Check (TCF) message, which acts as a sounding board to the transport circuit's ability to support the Bit Error Rate (BER) performance for a selected analog modem (i.e. V.17, V.29, or V.27ter). If the circuit cannot support the rate used by the TCF, then the terminating facsimile machine can assert a Failure to Train (FTT) message causing the originating facsimile machine to reduce its facsimile transfer rate. However, this technique cannot be applied to the situation concerning the quality of the transport channel across the RF interface because the analog modem is not involved in the transfer of data across the subject RF channel. Therefore, there is a need for an improved method and apparatus for modifying facsimile data transfer rates based upon varying bit rates of a transport medium.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
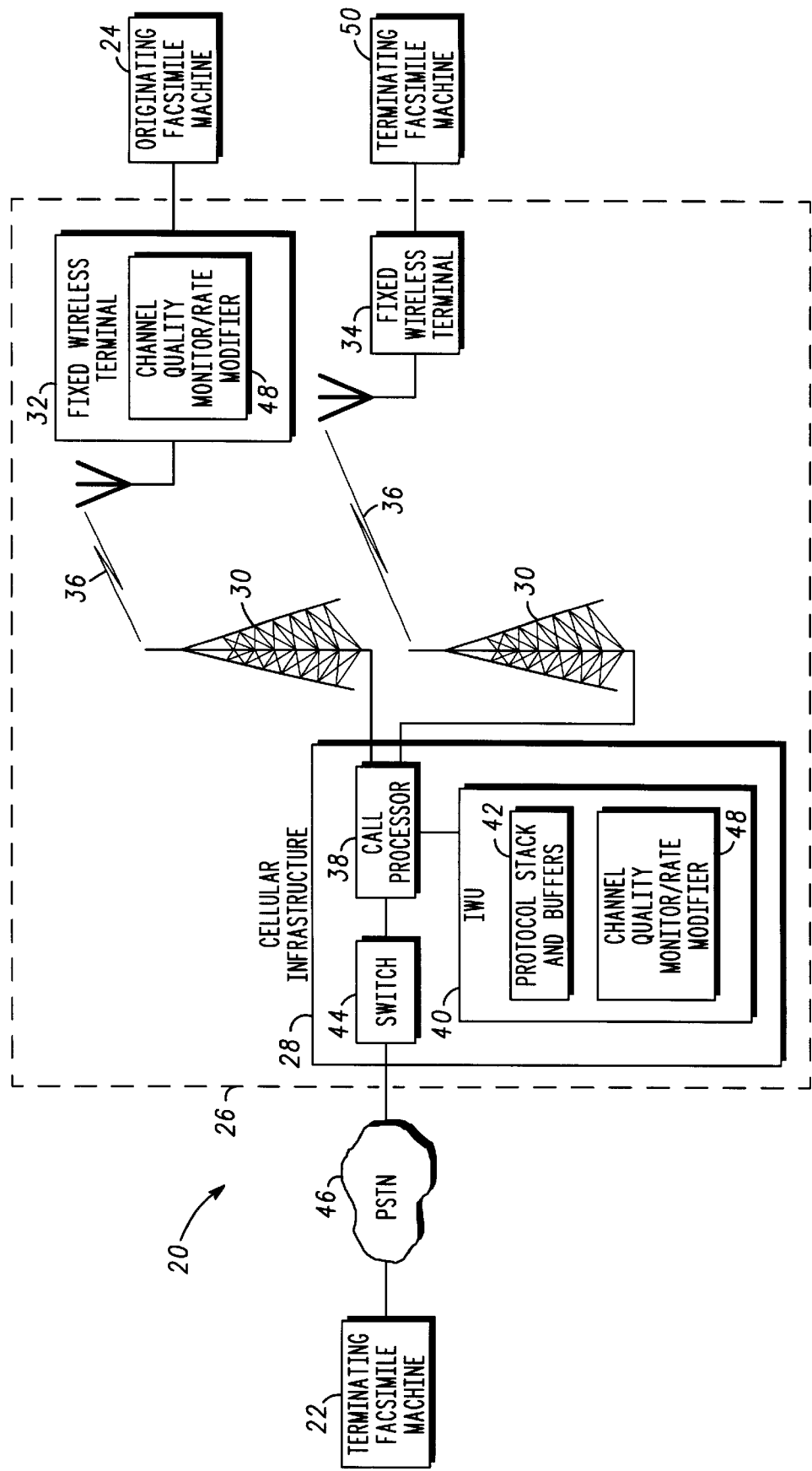
FIG. 1 illustrates a block diagram of a facsimile telecommunications system in accordance with the preferred embodiment of the present invention depicting originating and terminating facsimile machines coupled through a communication medium having a variable data transmission time.

With reference now to the figures, and in particular with reference to FIG. 1, there is depicted a telecommunication system 20, wherein originating facsimile machine 24 is coupled to terminating facsimile machine 22 via a communication link having a plurality of communication media, including a medium having a variable data transmission time. In the example shown in FIG. 1, the medium having a variable data transmission time is a wireless medium. In FIG. 1, the wireless medium is more particularly implemented with wireless local loop system 26.

Wireless local loop system 26 may include cellular infrastructure 28 coupled to base station transceivers 30. Base station transceivers 30 are typically located throughout a communication system service area so that they may communicate with fixed wireless terminals 32 and 34, also located throughout the service area, via air interface 36. In a preferred embodiment, air interface 36 is a code division multiple access (CDMA) air interface implemented in accordance with IS-95, which is a standard promulgated by Electronic Industries Association/Telecommunications Industry Association (EIA/TIA). While an IS-95 CDMA air interface is shown in the example of FIG. 1, other air interfaces or communication media having a variable data transmission time may be used. Examples of other communication media having a variable data transmission time include Global System for Mobile Communications (GSM), Universal Mobile Telecommunication System (UMTS), cdma2000, and other similar digital air interfaces, and the Internet which uses Transmission Control Protocol/Internet Protocol (TCP/IP).

Within cellular infrastructure 28, call processor 38 handles many of the functions needed to implement a cellular communication system. For example, call processor 38 may include an interworking transcoder voice function, a mobility management function, an error detection and correction function, and other such functions detailed in the communication media specification. Also within cellular infrastructure 28 is interworking function (IWF) or interworking unit (IWU) 40, which is coupled to call processor 38. Interworking unit 40 is a device for bridging or interfacing one communication format with another. It is typically responsible for converting data conforming to one data communication standard to data conforming to another. With particular relevance to the present invention, interworking unit 40 is a device within cellular infrastructure 28 that processes facsimile image data and facsimile messages in accordance with specification IS-707-A promulgated by ITU. Thus, when call processor 38 receives data that it is not designed to process (e.g., data other than voice data), call processor 38 routes such data to interworking unit 40 so that it is properly processed. Although shown separately in the example of FIG. 1, interworking unit 40 may be more closely integrated with call processor 38. It is shown separately here to emphasize the functions of the present invention. Within interworking unit 40, appropriate protocol stacks and buffers 42 are created, maintained, and operated in order to properly transfer facsimile messages and image data in accordance with specification IS-707-A.

Switch 44 within the cellular infrastructure 28 is used to selectively couple elements with call processor 38 to the public switched telephone network (PSTN) 46. Switch 44 may also be used to connect elements within call processor 38 to the proper interworking unit 40.

As part of the overall communication link, fixed wireless terminal 32 provides local loop telephone service to originating facsimile machine 24. The communication media in this part of the link is preferably twisted pair telephone wire. In another part of the link, cellular infrastructure 28, base station transceiver 30, and air interface 36 work together to wirelessly couple fixed wireless terminal 32 to the public switched telephone network 46.

The part of the communication link between fixed wireless terminal 32 and the output of switch 44 may be referred to as a variable data transmission time media. The part of the communication link between the output of switch 44 and terminating facsimile machine 22 may be considered a fixed or constant data transmission time media. Although a preferred embodiment is described as including a variable data transmission time media and a constant data transmission time media, other suitable configurations can readily and easily be used without deviating from the spirit and scope of the present invention as defined by the appended claims. For example, one skilled in the art would recognize that any combination of constant data transmission time media, such as land line data transmission, and/or variable data transmission time media, such as wireless data transmission, could be substituted for the above-referenced configuration.

According to an aspect of the embodiment shown in FIG. 1 of the present invention, fixed wireless terminal 32 includes channel quality monitor/rate modifier 48, as described in greater detail below. In addition, FIG. 1 alternately depicts IWU 40 including channel quality monitor/rate modifier 48. If terminating facsimile machine 22 was changed to an originating facsimile machine and originating facsimile machine 24 was changed to a terminating facsimile machine (i.e. facsimile machine 22 communicating with facsimile machine 24), channel quality monitor/rate modifier 48 in IWU 40 may be used according to the present invention to modify facsimile data transfer rates based upon varying bit rates of the transport medium, or channel quality monitor/rate modifier 48 in fixed wireless terminal 32 may be used to modify the facsimile data transfer rates. Also note that if terminating facsimile machine 22 was changed to an originating facsimile machine (i.e. facsimile machine 22 communicating with facsimile machine 50), channel quality monitor/rate modifier 48 in IWU 40 may be used according to the present invention to modify facsimile data transfer rates based upon varying bit rates of the transport medium, or channel quality monitor/rate modifier 48 in fixed wireless terminal 32 may be used to modify the facsimile data transfer rates. In addition, although fixed wireless terminals 32 and 34 are not shown the same way in FIG. 1, they may be implemented the same way, in that each may contain a channel quality monitor/rate modifier, or may be implemented with the same fixed wireless terminal. In addition, if fixed wireless terminal 34 were connected to an originating facsimile machine, then fixed wireless terminal 34 would contain a channel quality monitor/rate modifier, and fixed wireless terminal 32 need not necessarily contain a channel quality monitor/rate modifier.

Figure 2:
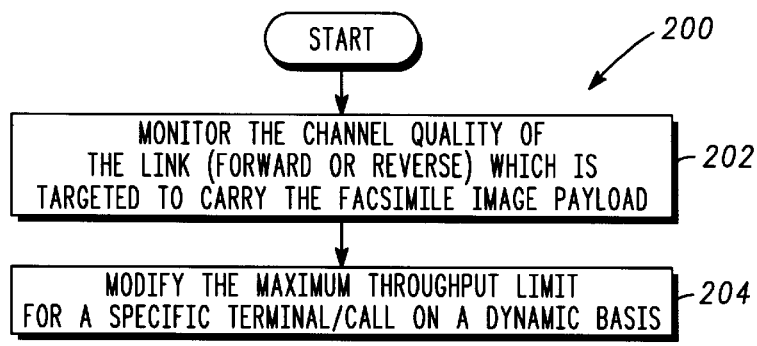
FIG. 2 illustrates a logical flowchart of the process of modifying facsimile data transfer rates between an originating facsimile machine and a terminating facsimile machine according to the method and system of the present invention.

With reference now to FIG. 2, there is depicted a logical flowchart of the process of modifying facsimile data transfer rates between an originating facsimile machine 24 and a terminating facsimile 22 according to the method and system of the present invention. Note that the process shown in the flowchart of FIG. 2 takes place within a device or devices located in a communication link between an originating facsimile machine and a terminating facsimile machine. This device may be, for example, a fixed wireless terminal in a wireless local loop system, or an interworking unit in the cellular infrastructure of a wireless local loop system. The process shown may also be executed in devices in communication links over a network, such as a local area network or the Internet.

According to an embodiment of the present invention, the communication link between the originating facsimile machine and the terminating facsimile machine includes more than one media. These different media are coupled together by interworking devices to form the overall communication link between the originating facsimile machine and the terminating facsimile machine. However, it will be appreciated by those skilled in the art that the communication link between the originating facsimile machine and the terminating facsimile machine need not include more than one media and still fall within the scope of the present invention.

As shown, the process begins at block 200, and thereafter passes to block 202 wherein the step of monitoring the channel quality of the link (forward or reverse) which is targeted to carry the facsimile image payload is performed. Note that this step, as well as the other steps in FIG. 2, may be more clearly understood with reference to FIGS. 3–12, which illustrate the flow of messages and the modification of messages in accordance with the method and system of the present invention. In response to monitoring the channel quality of the link, the process at step 204 modifies the maximum throughput limit for a specific terminal/call on a dynamic basis. In other words, in a preferred embodiment, a channel quality monitor is utilized in order to ascertain the capabilities of the wireless transport channel's bit rate on a per terminal, per subscriber basis. If such a channel quality monitor detects that the T.30 session between the originating facsimile machine ($TE2_{orig}$) and the answering facsimile machine ($TE2_{ans}$) is larger than the channel throughput capacity, than a rate modification process is triggered to dynamically adjust the target facsimile transfer rate from the originating facsimile machine to not exceed the limit dictated by the channel quality monitor. This rate modifier would at a minimum cause the negotiation of the $TE2_{orig}$ side of the call to a transfer rate that is not greater than the channel's throughput capacity as measured by the channel quality monitor.

The process to monitor the channel quality can be realized in many ways including, but not limited to (1) monitoring received Frame Error Rates (FER) on the subject link, (2) monitoring received or transmitted NACKs (negative acknowledgements) to packets received by the Radio Link Protocol (RLP), (3) averaging the payload bit count over transfer time, or (4) monitoring T.30 protocols for failures attributable to excessive delays in the transport of the image caused by channel inadequacies. Furthermore, these monitoring procedures can occur instantaneously or by examining state history for past facsimile calls of like type.

Figure 3:
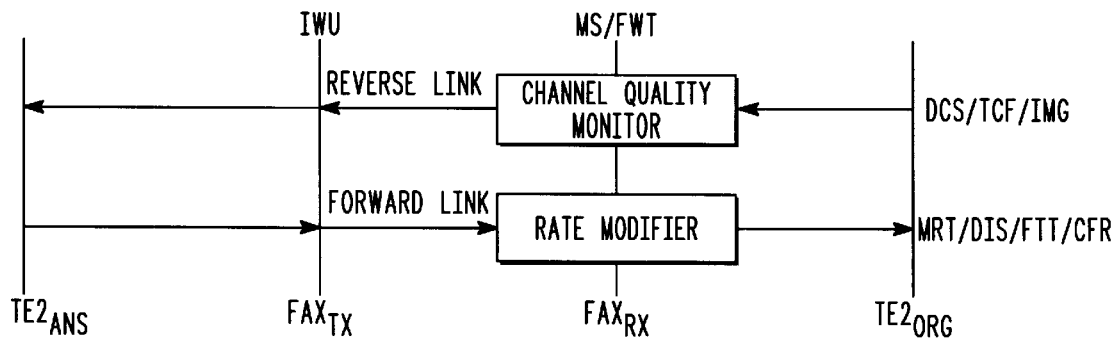
FIG. 3 illustrates an embodiment of the channel quality monitor and the rate modifier in a mobile station/fixed wireless terminal embodied, mobile originated facsimile session in accordance with the method and system of the present invention.
Figure 4:
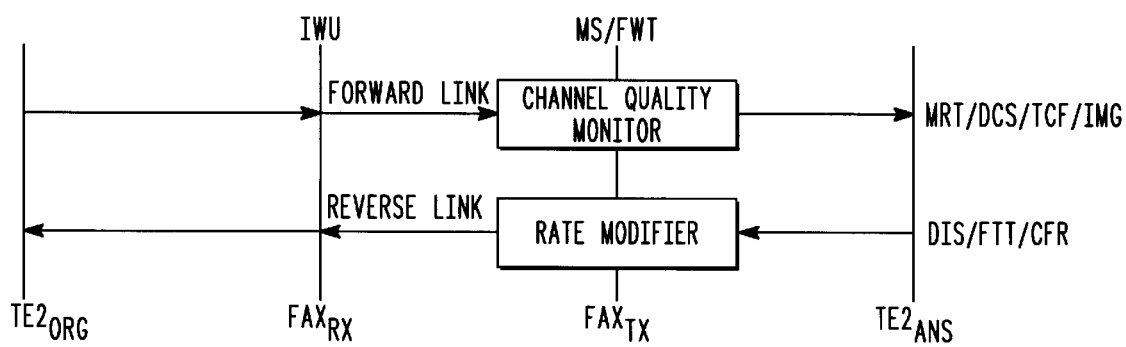
FIG. 4 illustrates an embodiment of the channel quality monitor and the rate modifier in a mobile station/fixed wireless terminal embodied, mobile terminated facsimile session in accordance with the method and system of the present invention.
Figure 5:
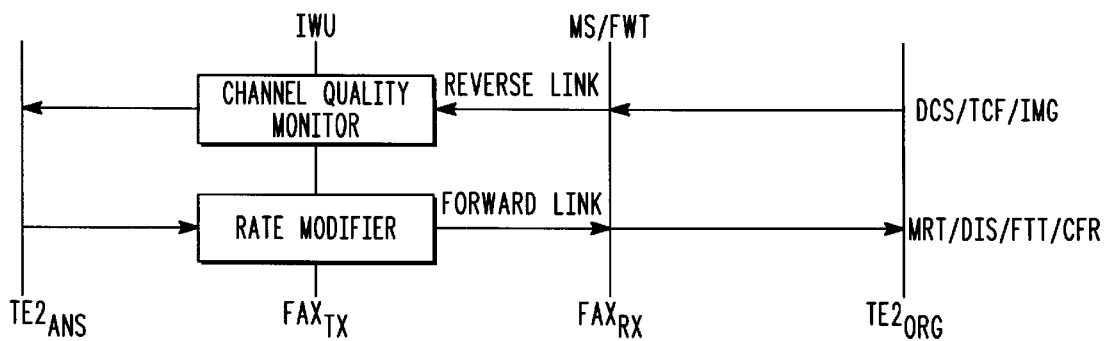
FIG. 5 illustrates an embodiment of the channel quality monitor and the rate modifier in an interworking unit embodied, mobile originated facsimile session in accordance with the method and system of the present invention.
Figure 6:
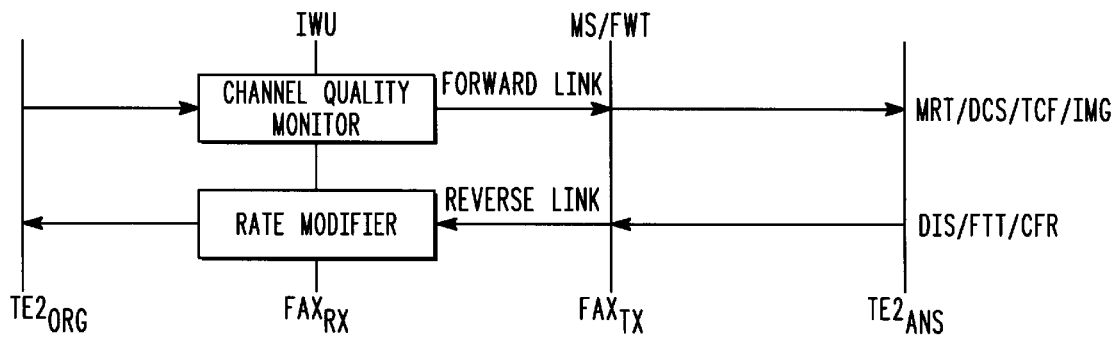
FIG. 6 illustrates an embodiment of the channel quality monitor and the rate modifier in an interworking unit embodied, mobile terminated facsimile session in accordance with the method and system of the present invention.

With reference to FIGS. 3–6, various embodiments of the channel quality monitor and the rate modifier in different devices for different facsimile types (origination vs. termination) are depicted. For example, FIG. 3 illustrates an embodiment of the channel quality monitor and the rate modifier in a mobile station/fixed wireless terminal embodied, mobile originated facsimile session. FIG. 4 illustrates an embodiment of the channel quality monitor and the rate modifier in a mobile station/fixed wireless terminal embodied, mobile terminated facsimile session. FIG. 5 illustrates an embodiment of the channel quality monitor and the rate modifier in an interworking unit embodied, mobile originated facsimile session. FIG. 6 illustrates an embodiment of the channel quality monitor and the rate modifier in an interworking unit embodied, mobile terminated facsimile session.

In a preferred embodiment, the channel quality monitor is preferably on the RF link which contains the image (IMG) messages and the rate modifier is preferably on the link containing any of the rate adjustment messages found in IS-707-A.7 (i.e.: Maximum Rate (MRT), Digital Information Signal (DIS), or Failure to Train (FTT)). In addition, it should be noted that the IS-707-A.7 protocol operates under the assumption that the CDMA RF link is capable of maintaining some level of consistent data rate throughput. This level must be fast enough to handle the transport of 7,200 bps facsimile data for rate set 1 or 12,000 bps facsimile data for rate set 2, while providing for all necessary packet overhead required. Conditions causing the RF channel to degrade enough to drop the throughput efficiencies below this level can and do exist, sometimes for extended duration for non-mobile units such as fixed wireless terminals. In order to accommodate these situations, the IS-707-A.7 protocol permits the system to run at the next lower quantum facsimile rate; 4,800 and 9,600 for rate set 1 and rate set 2, respectively. Further, in the description of FIGS. 7–12 that follow, it should be noted that the T.30 specifications are quantized to the following facsimile data rates: 2,400 bps, 4,800 bps, 7,200 bps, 9,600 bps, 12,000 bps, and 14,400 bps.

The three rate adjustment messages: MRT, DIS, and FTT, are shown in use in FIGS. 7–12. For reference, in these figures the channel quality monitor is on a "generic" RF link labeled A-B, which is analogous to air interface 36 shown in FIG. 1. This link corresponds to an appropriate forward or reverse RF link as applicable for the given embodiment. In each figure, the reference numeral (1) indicates the location of an actual rate modification as defined in the present invention. A reference numeral (2) or (3) indicates a rate modification as already defined by the IS-707-A.7 specification in order to accomplish a fixed, system wide maximum rate limit communicated using an MRT at reference (a), where a (2) indicates DIS modifications and a (3) indicates forced FTT fallbacks. Furthermore, in FIGS. 7–11, the embodiment of the channel quality monitor and rate modifier is referenced in either a $FAX_{rx}$ or a $FAX_{tx}$ device. This can be either a BTS/CBSC/IWU or an MS/FWT depending on the direction of the facsimile call, where $FAX_{rx}$ refers to the device connected to the originating facsimile machine ($TE2_{orig}$), which is analogous to reference numeral 24 shown in FIG. 1, and $FAX_{tx}$ refers to the device connected to the terminating facsimile machine ($TE2_{ans}$), which is analogous to reference numeral 22 shown in FIG. 1. FIG. 12 is unique in that it is only embodied in the BTS/CBSC/IWU device as described below.

Figure 7:
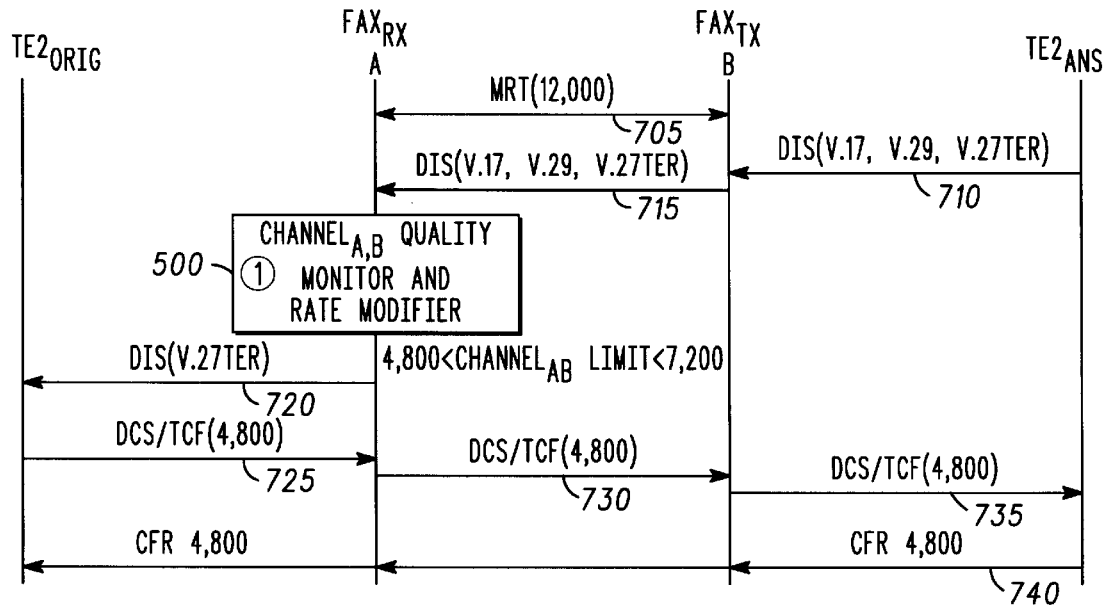
FIG. 7 illustrates an embodiment of the present invention wherein the device coupled to the originating facsimile machine performs a rate modification via a DIS message.
Figure 9:
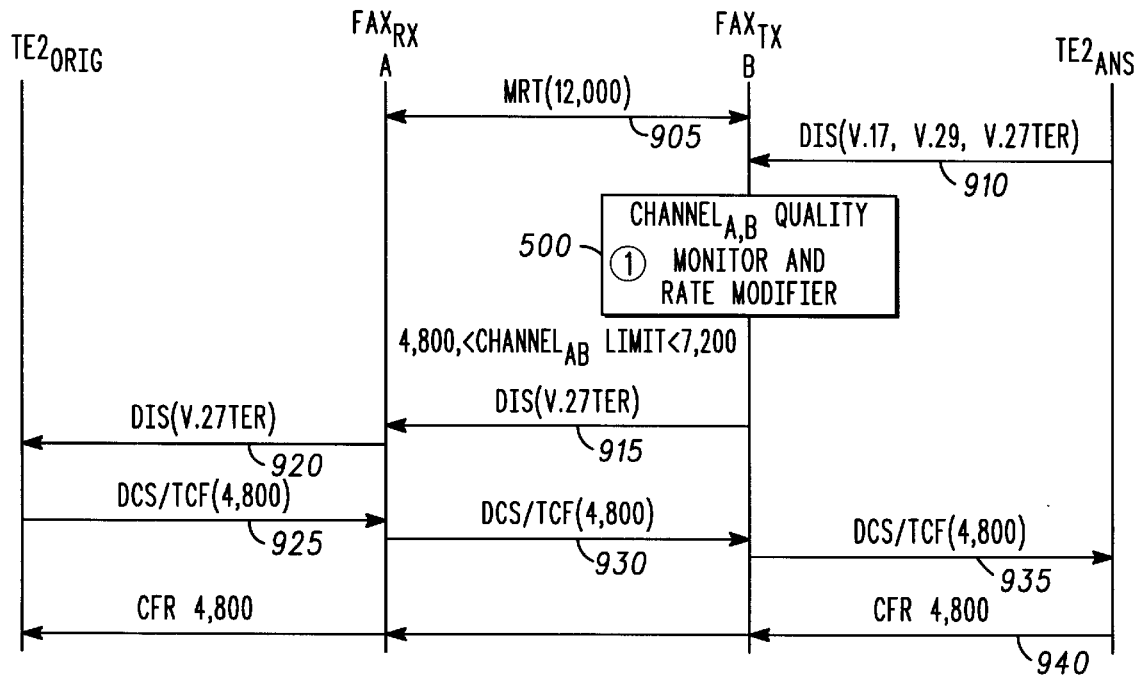
FIG. 9 illustrates an embodiment of the present invention wherein the device coupled to the terminating facsimile machine performs a rate modification via a DIS message.

Usage of the DIS message to enforce rate modification is shown in FIGS. 7 and 9, which illustrate embodiments of the present invention wherein the device coupled to the originating facsimile machine and the terminating facsimile machine, respectively, performs a rate modification via a DIS message. In these cases, the advertised capabilities are filtered to a subset of the original $TE2_{ans}$ capabilities such that only modulation schemes that transfer at rates less than the channel capacity are present. This means that V.27ter is used for 2,400 bps and 4,800 bps capacities, V.29 (preferred) or V.27ter is used for 7,200 bps or 9,600 bps, and V.17 (preferred), V.29, or V.27ter for 12,000 bps channel capacities.

FIG. 7 illustrates an embodiment of the present invention wherein the device coupled to the originating facsimile machine, in this case $FAX_{rx}$, performs a rate modification via a DIS message. Referring to FIG. 7, a maximum transfer rate of 12,000 bps is communicated via a MRT message on the RF link A-B as shown at reference numeral 705. A Digital Identification Signal (DIS) message, which is a message from a terminating facsimile machine that discloses the terminating facsimile machine's capabilities to receive a facsimile transmission that is transmitted in one of a set of offered transmission modes, is sent from $TE2_{ans}$ to $FAX_{tx}$ as shown at reference numeral 710 in this example, the offered transmission modes are defined by specifications V.17, V.29, and V.27ter. The DIS message is thereafter sent from $FAX_{tx}$ to $FAX_{rx}$ as shown at reference numeral 715. Channel quality monitor/rate modifier 500 thereafter compares the maximum transfer rate to the channel capacity. In this case, the channel capacity is between 4,800 bps and 7,200 bps, causing a DIS message containing V.27ter to be sent from $FAX_{rx}$ to $TE2_{orig}$ as shown at reference numeral 720. Thereafter, a Digital Command Signal/Training Check Message (DCS/TCF) having a maximum data rate of 4,800 bps is sent from $TE2_{orig}$ to $FAX_{rx}$, from $FAX_{rx}$ to $FAX_{tx}$, and from $FAX_{tx}$ to $TE2_{ans}$ as shown at reference numerals 725, 730, and 735, respectively. Thereafter, a Confirmation to Receive (CFR) message, which is a message that tells the originating facsimile machine that the training sequence has been successfully received and that the communication link between the originating and terminating facsimile machines will probably support the V.27ter mode of facsimile data transmission is sent from $TE2_{ans}$ to $TE2_{orig}$ as shown at reference numeral 740.

FIG. 9 illustrates an embodiment of the present invention wherein the device coupled to the terminating facsimile machine, in this case $FAX_{tx}$ performs a rate modification via a DIS message. Referring to FIG. 9, a maximum transfer rate of 12,000 bps is communicated via a MRT message on the RF link A-B as shown at reference numeral 905. A DIS message is sent from $TE2_{ans}$ to $FAX_{tx}$ as shown at reference numeral 910. In this example, the offered transmission modes are defined by specifications V.17, V.29, and V.27ter. Channel quality monitor/rate modifier 500 thereafter compares the maximum transfer rate to the channel capacity. In this case, the channel capacity is between 4,800 bps and 7,200 bps, causing a DIS message containing V.27ter to be sent from $FAX_{tx}$ to $FAX_{rx}$ as shown at reference numeral 915. The DIS message is thereafter sent from $FAX_{rx}$ to $TE2_{orig}$ as shown at reference numeral 920. Thereafter, a DCS/TCF message having a maximum data rate of 4,800 bps is sent from $TE2_{orig}$ to $FAX_{rx}$, from $FAX_{rx}$ to $FAX_{tx}$, and from $FAX_{tx}$ to $TE2_{ans}$ as shown at reference numerals 925, 930, and 935, respectively. Thereafter, a CFR message is sent from $TE2_{ans}$ to $TE2_{orig}$ as shown at reference numeral 940.

Figure 8:
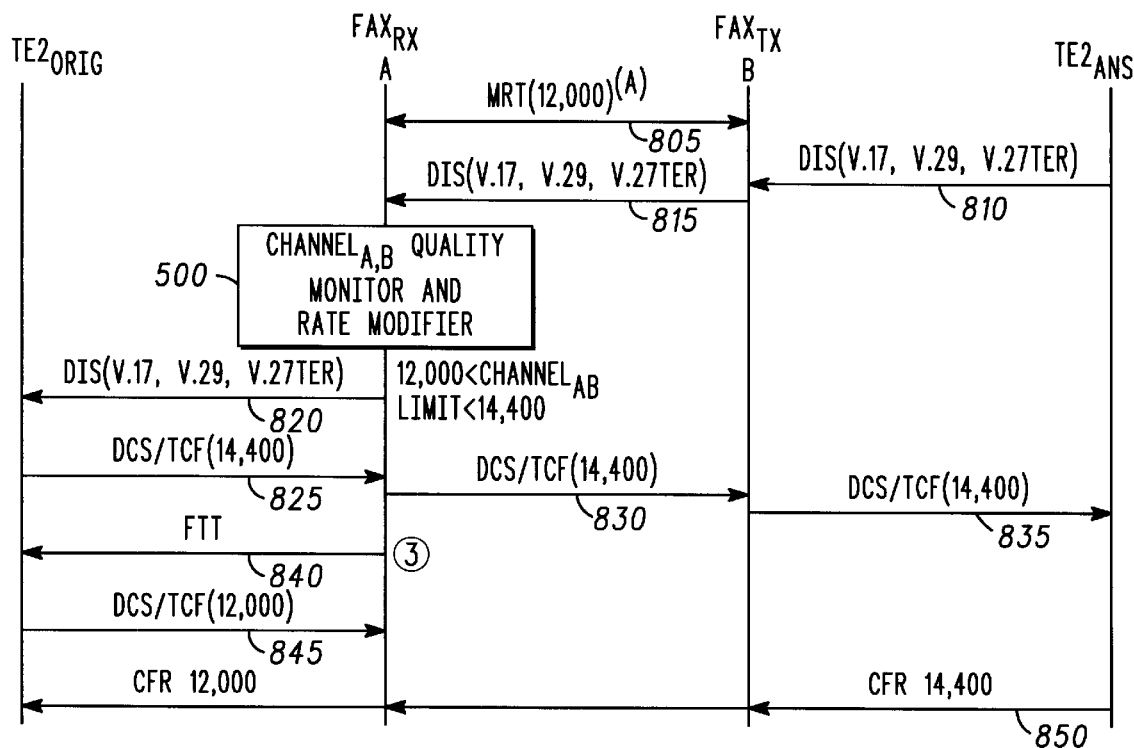
FIG. 8 illustrates an embodiment of the present invention wherein the device coupled to the originating facsimile machine avoids rate modification because the channel is sufficient to handle the maximum rate allowed, thereby allowing existing protocols to handle rate adjustments.
Figure 10:
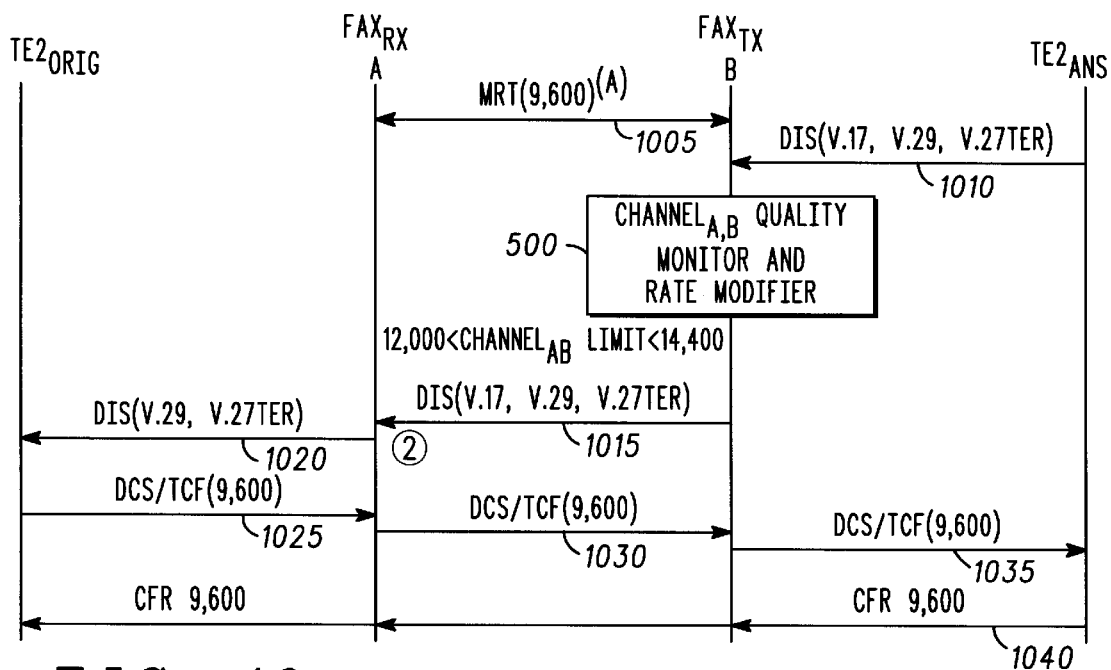
FIG. 10 illustrates an embodiment of the present invention wherein the device coupled to the terminating facsimile machine avoids rate modification because the channel is sufficient to handle the maximum rate allowed, thereby allowing existing protocols to handle rate adjustments.

Usage of a benign rate modifier to enforce rate modification is shown in FIGS. 8 and 10, which illustrate embodiments of the present invention wherein the device coupled to the originating facsimile machine and the terminating facsimile machine, respectively, avoids a rate modification because the channel is sufficient to handle the maximum rate allowed, thereby allowing existing protocols to handle the rate adjustments. Referring to FIG. 8, a maximum transfer rate of 12,000 bps is communicated via a MRT message on the RF link A-B as shown at reference numeral 805. A DIS message is sent from $TE2_{ans}$ to $FAX_{tx}$ as shown at reference numeral 810, In this example, the offered transmission modes are defined by specifications V.17, V.29, and V.27ter. The DIS message is thereafter sent from $FAX_{tx}$ to $FAX_{rx}$ as shown at reference numeral 815. Channel quality monitor/rate modifier 500 thereafter compares the maximum transfer rate to the channel capacity. In this case, the channel capacity is between 12,000 bps and 14,400 bps, causing a DIS message containing all three specifications to be sent from $FAX_{rx}$ to $TE2_{orig}$ as shown at reference numeral 820. Thereafter, a DCS/TCF message having a maximum data rate of 14,400 bps is sent from $TE2_{orig}$ to $FAX_{rx}$, from $FAX_{rx}$ to $FAX_{tx}$ and from $FAX_{tx}$ to $TE2_{ans}$ as shown at reference numerals 825, 830, and 835, respectively. Thereafter, a Failure to Train (FTT) message is sent from $FAX_{rx}$ to $TE2_{orig}$ as shown at reference numeral 840, causing a stepped down data rate of 12,000 bps to be sent from $TE2_{orig}$ to $FAX_{rx}$ via a DCS/TCF message as shown at reference numeral 845. Note that the issuance of the FTT message at shown at reference numeral 840 is due to existing IS-707-A protocol which limits the rate to 12,000 bps as specified in the MRT message received as shown at reference numeral 805. Thereafter, a CFR message is sent from $TE2_{ans}$ to $TE2_{orig}$ as shown at reference numeral 850.

Referring to FIG. 10, a maximum transfer rate of 9,600 bps is communicated via a MRT message on the RF link A-B as shown at reference numeral 1005. A DIS message is sent from $TE2_{ans}$ to $FAX_{tx}$ as shown at reference numeral 1010. In this example, the offered transmission modes are defined by specifications V.17, V.29, and V.27ter. Channel quality monitor/rate modifier 500 thereafter compares the maximum transfer rate to the channel capacity. In this case, the channel capacity is between 12,000 bps and 14,400 bps, causing a DIS message containing each of the above-referenced specifications to be sent from $FAX_{tx}$ to $FAX_{rx}$ as shown at reference numeral 1015. A DIS message containing specifications V.29 and V.27ter is thereafter sent from $FAX_{rx}$ to $TE2_{orig}$ as shown at reference numeral 1020. V.17 was removed from the offered transmission modes in accordance with existing IS-707-A protocols, which limit the rate to 9,600 bps as specified by the MRT message received as shown at reference numeral 1005. Thereafter, a DCS/TCF message having a maximum data rate of 9,600 bps is sent from $TE2_{orig}$ to $FAX_{rx}$, from $FAX_{rx}$ to $FAX_{tx}$, and from $FAX_{tx}$ to $TE2_{ans}$ as shown at reference numerals 1025, 1030, and 1035, respectively. Thereafter, a CFR message is sent from $TE2_{ans}$ to $TE2_{orig}$ as shown at reference numeral 1040.

Figure 11:
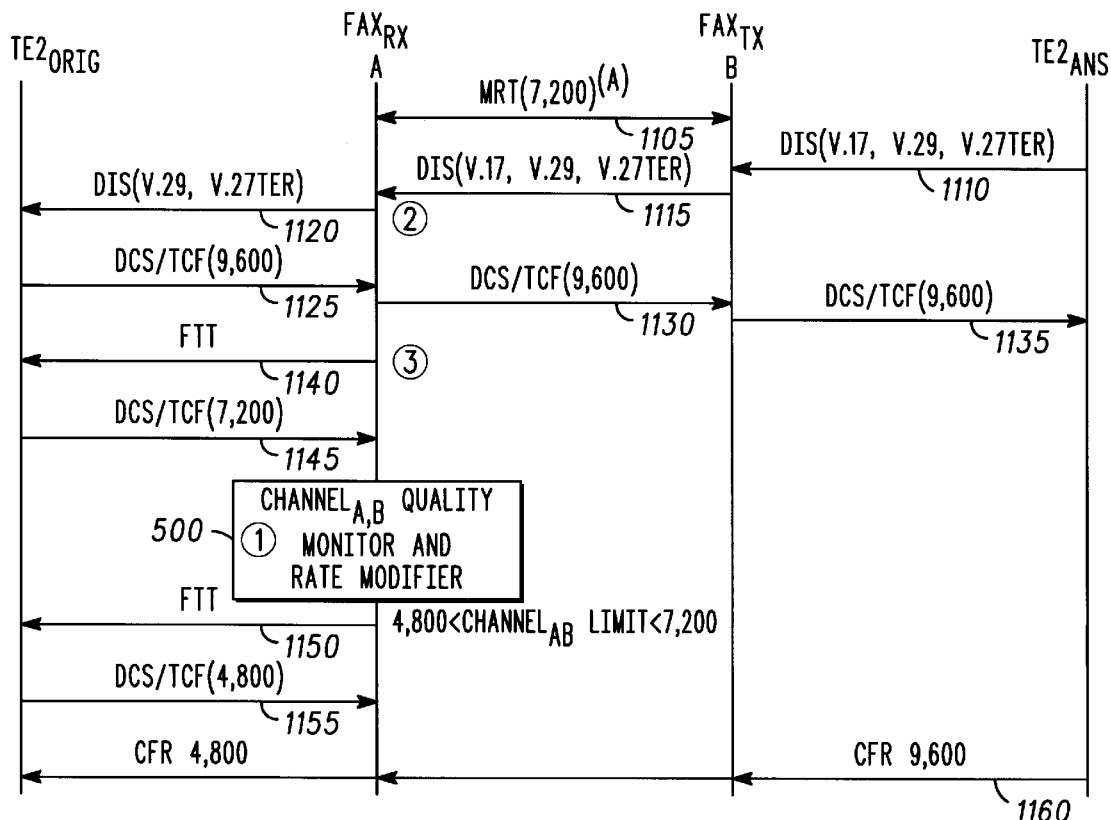
FIG. 11 illustrates an embodiment of the present invention wherein the device coupled to the originating facsimile machine performs a rate modification via a FTT message.
Figure 12:
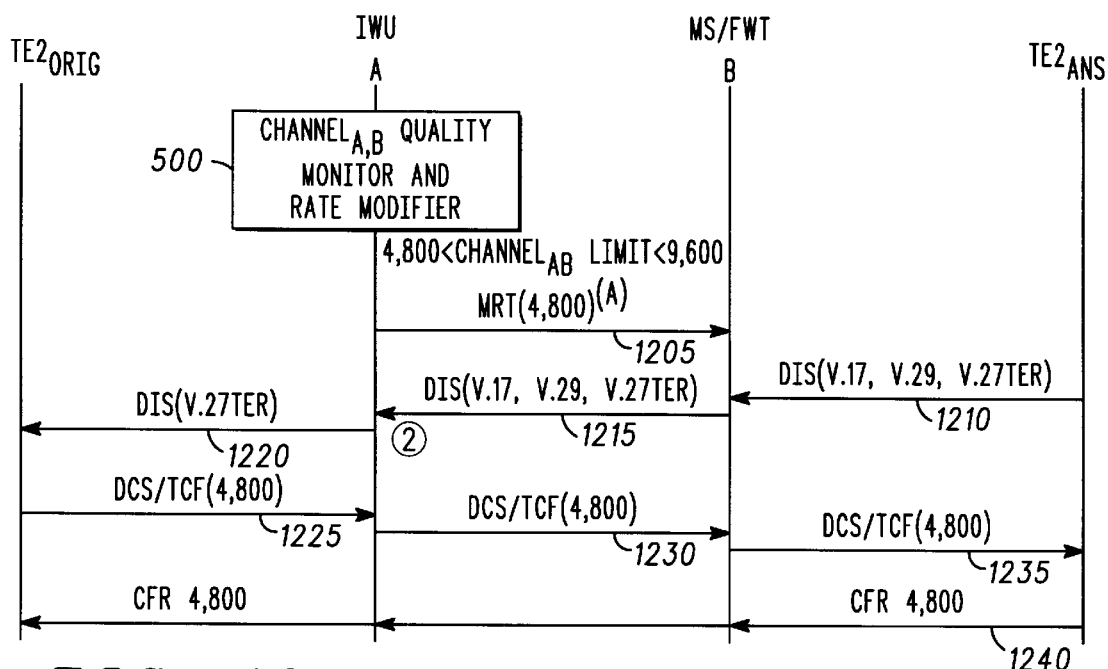
FIG. 12 illustrates an embodiment of the present invention wherein the interworking unit performs a rate modification via a MRT message.

While rate modification via a DIS message is described as the preferred embodiment of this invention, two other embodiments are shown in FIGS. 11 and 12. The first shows the usage of the Failure to Train (FTT) and rate fallback in the T.30 protocol to force the $TE2_{orig}$ to a limit no larger than the channel capacity. FIG. 12 shows the usage of a unique MRT for a given MS/FWT and a given call in order to cause that unit to have a unique rate limit as dictated by the channel quality monitor/rate modifier.

Referring to FIG. 11, a maximum transfer rate of 7,200 bps is communicated via a MRT message on the RF link A-B as shown at reference numeral 1105. A DIS message is sent from $TE2_{ans}$ to $FAX_{tx}$ as shown at reference numeral 1110, In this example, the offered transmission modes are defined by specifications V.17, V.29, and V.27ter. The DIS message is thereafter sent from $FAX_{tx}$ to $FAX_{rx}$ as shown at reference numeral 1115, wherein $FAX_{rx}$ performs rate modification via a FTT message as follows. A DIS message containing specifications V.29 and V.27ter is sent from $FAX_{rx}$ to $TE2_{orig}$ as shown at reference numeral 1120. V.17 was removed from the offered transmission modes in accordance with existing IS-707-A protocols, which limit the rate to 9,600 bps as specified by the MRT message received as shown at reference numeral 1005. V.17 was removed from the offered transmission modes in accordance with existing IS-707-A protocols, which limit the rate to 7,200 bps as specified by the MRT message received as shown at reference numeral 1105. A DCS/TCF message having a maximum data rate of 9,600 bps is sent from $TE2_{orig}$ to $FAX_{rx}$, from $FAX_{rx}$ to $FAX_{tx}$, and from $FAX_{tx}$ to $TE2_{ans}$ as shown at reference numerals 1125, 1130, and 1135, respectively. Thereafter, a FTT message is sent from $FAX_{rx}$ to $TE2_{orig}$ as shown at reference numeral 1140, causing a stepped down rate of 7,200 bps to be sent from $TE2_{orig}$ to $FAX_{rx}$ via a DCS/TCF message as shown at reference numeral 1145. Note that the issuance of the FTT message at shown at reference numeral 1140 is due to existing IS-707-A protocol which limits the rate to 7,200 bps as specified in the MRT message received as shown at reference numeral 1105. Channel quality monitor/rate modifier 500 thereafter compares the maximum transfer rate to the channel capacity. In this case, the channel capacity is between 4,800 bps and 7,200 bps, causing a FTT message to be sent from $FAX_{rx}$ to $TE2_{orig}$ as shown at reference numeral 1150, wherein the data rate is again stepped down and a DCS/TCF message having a lower data rate of 4,800 bps is sent from $TE2_{orig}$ to $FAX_{rx}$ as shown at reference numeral 1155. Thereafter, a CFR message is sent from $TE2_{ans}$ to $TE2_{orig}$ as shown at reference numeral 1160.

FIG. 12, illustrates the usage of a unique MRT for a given MS/FWT and a given call in order to cause that unit to have a unique rate limit as dictated by the channel quality monitor/rate modifier. Channel quality monitor/rate modifier 500 compares the maximum transfer rate to the channel capacity. As shown in FIG. 12, the channel capacity is between 4,800 bps and 9,600 bps. A maximum transfer rate of 4,800 bps is communicated via a MRT message on the RF link A-B as shown at reference numeral 1205. A DIS message is sent from $TE2_{ans}$ to MS/FWT shown at reference numeral 1210. In this example, the offered transmission modes are defined by specifications V.17, V.29, and V.27ter. The DIS message is thereafter sent from MS/FWT to BTS/CBSC as shown at reference numeral 1215. A DIS message containing only specification V.27ter is sent from BTS/CBSC to $TE2_{orig}$ as shown at reference numeral 1220. V.17 was removed from the offered transmission modes in accordance with existing IS-707-A protocols, which limit the rate to 4,800 bps as specified by the MRT message received as shown at reference numeral 1205. Thereafter, a DCS/TCF message having a maximum data rate of 4,800 bps is sent from $TE2_{orig}$ to BTS/CBSC, from BTS/CBSC to MS/FWT, and from MS/FWT to $TE2_{ans}$ as shown at reference numerals 1225, 1230, and 1235, respectively. Thereafter, a CFR is sent from $TE2_{ans}$ to $TE2_{orig}$ as shown at reference numeral 1240.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for modifying facsimile data transfer rates for a facsimile call between an originating facsimile machine and a terminating facsimile machine, comprising the steps of:
   monitoring channel quality of an asynchronous link, the asynchronous link adapted to transport a facsimile image;
   in response to the step of monitoring, dynamically modifying a maximum data transfer rate between the originating facsimile machine and the terminating facsimile machine, wherein the step of monitoring includes the step of determining the channel's throughput capacity and wherein the step of determining the channel's throughput capacity includes at least one of:
   monitoring received frame error rates on the link;
   monitoring one of received and transmitted negative acknowledgements to packets received by a radio link protocol;
   averaging a payload bit count over a transfer time;
   monitoring T.30 protocols for failures attributable to excessive delays in the transport of the image caused by channel inadequacies; and
   examining state history for prior facsimile calls, wherein the prior facsimile calls are of the same type as the facsimile call's type.

2. A method as recited in claim 1, wherein the step of dynamically modifying includes the step of negotiating the originating facsimile machine side of a call to a data transfer rate that is no greater than the monitored channel quality.

3. A method as recited in claim 2, wherein the step of dynamically modifying a maximum data transfer rate includes at least one of:
   dynamically modifying via an FTT message;
   dynamically modifying via a DIS message; and
   dynamically modifying via an MRT message.

4. A method as recited in claim 1, wherein the asynchronous link is an RF link.

5. An apparatus for modifying facsimile data transfer rates for a facsimile call between an originating facsimile machine and a terminating facsimile machine, comprising:
   a channel quality monitor adapted to monitor channel quality of an asynchronous link, the asynchronous link adapted to transport a facsimile image;
   a rate modifier adapted to dynamically modify a maximum data transfer rate between the originating facsimile machine and the terminating facsimile machine in response to the channel quality, wherein the channel quality monitor is adapted to determine the channel's throughput capacity and wherein the channel's throughput capacity is determined by at least one of:
   received frame error rates on the link;
   one of received and transmitted negative acknowledgements to packets received by a radio link protocol;
   an examination of T.30 protocols for failures attributable to excessive delays in the transport of the image caused by channel inadequacies;
   an average payload bit count over a transfer time; and
   an examination of state history for prior facsimile calls, wherein the prior facsimile calls are of the same type as the facsimile call's type.

6. An apparatus as recited in claim 5, wherein the rate modifier is adapted to negotiate the originating facsimile machine side of a call to a data transfer rate that is no greater than the channel's throughput capacity.

7. An apparatus as recited in claim 6, wherein the rate modifier is further adapted to dynamically modify the maximum data transfer rate via at least one of:
   an FTT message;
   a DIS message; and
   an MRT message.

8. An apparatus as recited in claim 5, wherein the asynchronous link is an RF link.

9. An apparatus as recited in claim 5, wherein the apparatus is a fixed wireless terminal.

10. An apparatus as recited in claim 5, wherein the apparatus is an interworking unit.

11. A system for modifying facsimile data transfer rates for a facsimile call between an originating facsimile machine and a terminating facsimile machine, comprising:
    means for monitoring channel quality of an asynchronous link, the asynchronous link adapted to transport a facsimile image;
    means for dynamically modifying a maximum date transfer rate between the originating facsimile machine and the terminating facsimile machine in response to the channel quality, wherein the means for monitoring includes means for determining the channel's throughput capacity and wherein the means for determining the channel's throughput capacity includes at least one of:

means for monitoring received frame error rates on the link;

means for monitoring one of received and transmitted negative acknowledgements to packets received by a radio link protocol;

means for averaging a payload bit count over a transfer time;

means for monitoring T.30 protocols for failures attributable to excessive delays in the transport of the image caused by channel inadequacies; and means for examining state history for prior facsimile calls, wherein the prior facsimile calls are of the same type as the facsimile call's type.

12. A system as recited in claim 11, wherein the means for dynamically modifying includes means for negotiating the originating facsimile machine side of a call to a data transfer rate that is no greater than the monitored channel quality.

13. A system as recited in claim 12, wherein the means for dynamically modifying includes at least one of:

means for dynamically modifying via an FTT message;

means for dynamically modifying via a DIS message; and means for dynamically modifying via a MRT message.

14. A system as recited in claim 11, wherein the asynchronous link is an RF link.

* * * * *